United States Patent [19]
Wise

[11] Patent Number: 5,806,909
[45] Date of Patent: Sep. 15, 1998

[54] REMOVABLE BED LINER

[76] Inventor: Ronald D. Wise, 1305 Riverside Rd., Old Hickory, Tenn. 37138

[21] Appl. No.: 637,428

[22] Filed: Apr. 25, 1996

Related U.S. Application Data

[63] Continuation of Ser. No. 370,011, Jan. 9, 1995, abandoned.

[51] Int. Cl.[6] ..................................................... B60R 13/01
[52] U.S. Cl. ................... 296/39.1; 296/39.2; 296/97.23; 220/403
[58] Field of Search ........................... 370/11; 296/97.23, 296/39.1–39.3; 105/423; 220/403; 150/154; 160/352; 52/DIG. 13

[56] References Cited

U.S. PATENT DOCUMENTS

| | | | |
|---|---|---|---|
| 1,259,320 | 3/1918 | Tyler | 296/39.1 |
| 1,803,617 | 5/1931 | Hummel | 105/423 |
| 1,908,233 | 5/1933 | Fisher | 296/39.1 |
| 3,715,843 | 2/1973 | Ballinger | 52/3 |
| 4,181,349 | 1/1980 | Nix et al. | 296/50 X |
| 4,245,863 | 1/1981 | Carter | 296/39.2 |
| 4,279,439 | 7/1981 | Cantieri | 296/39.2 |
| 4,505,508 | 3/1985 | Carter et al. | 296/39.2 |
| 4,540,214 | 9/1985 | Wagner | 296/39.2 |
| 4,575,146 | 3/1986 | Markos | 296/39.2 |
| 4,789,574 | 12/1988 | Selvey | 296/39.2 |
| 4,860,777 | 8/1989 | Orlando | 52/DIG. 13 |
| 4,877,281 | 10/1989 | Altman | 296/39.1 |
| 4,893,862 | 1/1990 | Hollenbaugh, Sr. | 296/39.1 |
| 4,944,612 | 7/1990 | Abstetar et al. | 296/39.2 |
| 4,986,590 | 1/1991 | Patti et al. | 296/39.2 |
| 5,007,670 | 4/1991 | Wise | 296/39.1 |
| 5,215,345 | 6/1993 | Orphan | 296/39.1 |
| 5,378,034 | 1/1995 | Nelsen | 296/39.2 |

FOREIGN PATENT DOCUMENTS 93008102  4/1993  WIPO ................................. 220/403

*Primary Examiner*—Dennis H. Pedder
*Attorney, Agent, or Firm*—Gifford, Krass, Groh, Sprinkle, Patmore, Anderson & Citkowski, P.C.

[57] ABSTRACT

A removable, separable rug for the cargo area of a vehicle such as a pickup truck or a van comprises interattachable panels. The panels include a pair of side walls, a front wall, a back wall, and a floor. One or more of the panels may be selectively used at a time. The panels may be composed of a resiliently soft material such as an expanded plastic or a closed-cell polyethylene foam or may be a laminated, bi-layered pad comprising an upper layer of carpeting and a lower layer of resiliently soft material such as an expanded plastic or foam. Each of the panels is attached to the other panel by hook-and-loop fasteners or by zippers. The panels are removably attached to the vehicle cargo area by magnets, conventional fasteners such as screws, rivets, or snaps, or by hook-and-loop fasteners.

6 Claims, 1 Drawing Sheet

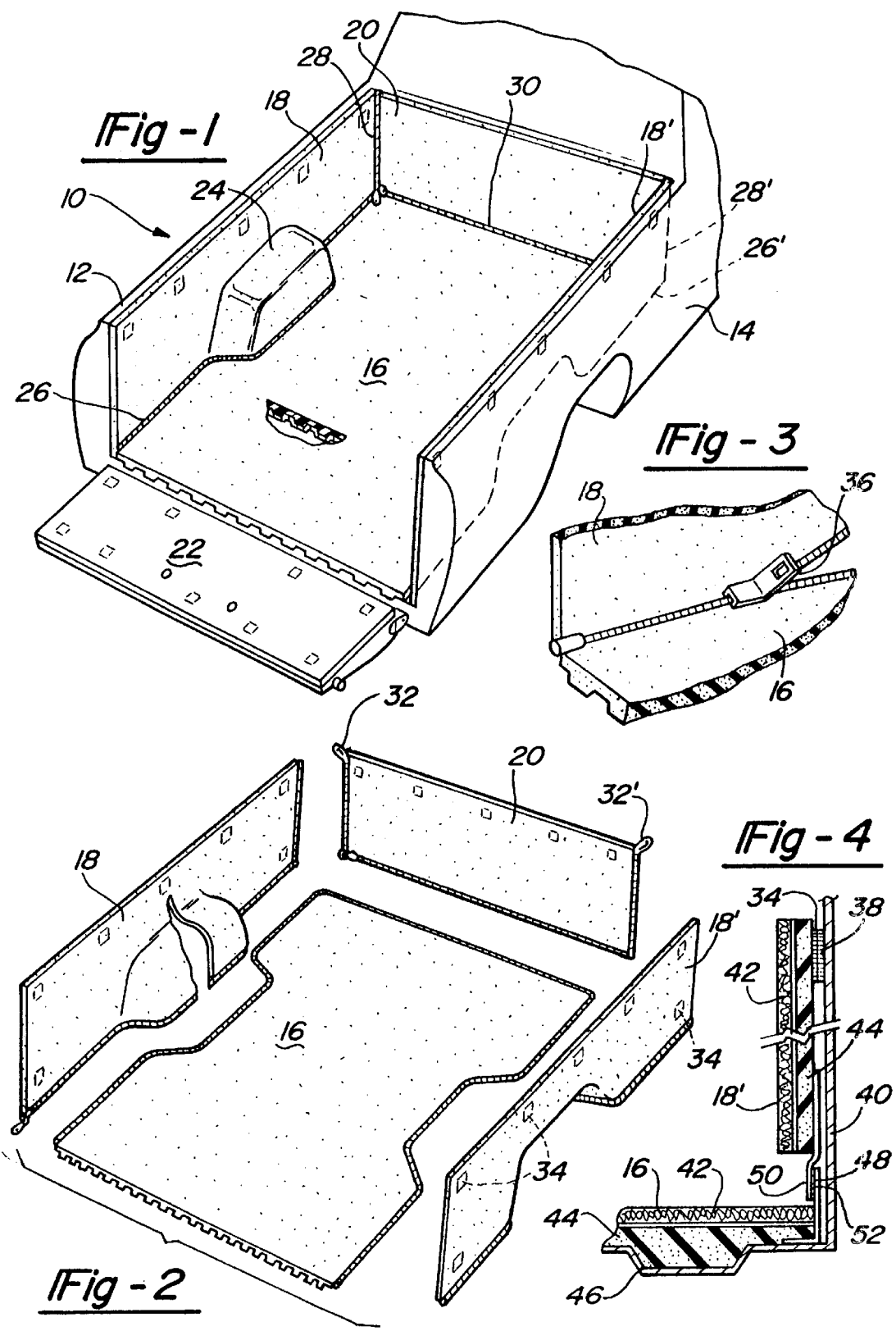

REMOVABLE BED LINER

This is a continuation of application Ser. No. 08/370,011 filed on Jan. 5, 1995, now abandoned.

BACKGROUND OF THE INVENTION

I. Field of the Invention

The present invention relates generally to bed liner assemblies for lining the bed surfaces of the cargo portion of pickup trucks and vans. More particularly, the present invention relates to a removable cargo bed rug comprising separable front, back, side, and floor panels. One or all of the panels may be used simultaneously. The panels are attachable to each other by means of hook and loop fasteners or a zipper.

II. Description of The Relevant Art

The pickup truck and cargo van have long been used for rugged and sometimes dirty work. For example, workers often used these vehicles for moving dirt, blocks, stones, old auto parts, and just about any item that would fit. Movement of such material was done with little or no regard for the vehicle, and after a very short time the van or truck looked worn and scratched.

To overcome this problem, vehicle manufacturers and after-market suppliers began to supply owners with protective bed liners. These units generally comprised one-pieced structures composed of a plastic. The liner of this design is lowered into the vehicle cargo area and, because of its one-piece construction, forms a large, unitary barrier to protect the bed from scratches and rust. Typical liners are shown in U.S. Pat. No. 4,181,349, issued on Jan. 1, 1980 to Nix et al., U.S. Pat. No. 4,540,214, issued on Sep. 10, 1985 to Wagner, and U.S. Pat. No. 4,575,146, issued on Mar. 11, 1986 to Markos.

However, these liners suffer from a variety of difficulties. For example, they are remarkably cumbersome and require an extensive amount of labor for installation and removal. Furthermore, the conventional bed liner does not store well and this feature prohibits the user from storing the liner when not in use. As a practical matter, the liner remains in the vehicle for as long as the owner owns it. Additionally, the conventional liner is surprisingly heavy, being composed of a high-density, heavy plastic. Finally, there is no convenient way to attach the liner to the cargo area other than by drilling screws or like fasteners through the cargo surface. This is a bad idea as not only is the surface forever marred, but the hole in the metal invites rust.

There have been attempts to overcome these problems. For example, in U.S. Pat. No. 4,986,590, issued on Jan. 22, 1991 to Patti et al., a lightweight truck bed liner is shown composed of a waxed corrugated board. However, while reducing the weight of the liner as compared with the conventional one-piece, rigid plastic liners, the liner of Patti et al. cannot be readily stored. Furthermore, the corrugated board construction of the liner of this patent does not provide a satisfactory amount of protection to the cargo area.

An effort to at least partially overcome the storage problem is set forth in the invention of U.S. Pat. No. 4,944,612, issued on Jul. 31, 1990 to Abstetar et al. This patent discloses a multi-pieced liner having a flexible base and rigid walls. The object of this invention is to eliminate fasteners, and thus the side panels are generally C-shaped and are constructed and arranged to fit between the underside of the inner side of the top edge of the truck bed wall and the floor of the truck body. The design provides for compression-retention of the pieces. However, the design still fails to overcome the storage problem, in that the rigid panels are difficult to store. Furthermore, by providing for a series of unattached and individual panels, the liner of the Abstetar et al. patent compromise the integrity of the liner by allowing for a variety of seams. In addition, the compression-retention system may not work well under working conditions where the panels are likely to get jostled about and, as a result, may become loose.

In an apparent response to the storage problem, U.S. Pat. No. 4,279,439, issued on Jul. 21, 1981 to Cantieri discloses a flexible rubber or vinyl liner having suction cups on its back side for attachment to the bed of a vehicle. A series of foldable flaps are provided for covering the walls and tailgate. However, the liner of this patent, while providing a liner that can be rolled and stored, fails to provide satisfactory protection because of its foldable flap construction. Its limp rubber construction does not provide support sufficient to prevent its curling or falling out of place. The advantage of easy storage is outweighed by the weak, non-rigid structure of the material.

Accordingly, the known methods for lining a vehicle cargo area have generally failed.

SUMMARY OF THE PRESENT INVENTION

The present invention provides a removable, separable rug for the cargo area of a pickup truck or a cargo van. The rug is made up of a plurality of separable panels. The panels include a pair of side panels, a front panel, and a floor panel. A rear panel is optionally provided for removable attachment to the inner side of the tail gate or rear door.

The panels may be composed of a variety of materials including cloth, or a resiliently soft material such as an expanded plastic or a closed-cell polyethylene foam. Alternatively, the panels may be composed of a laminated, multi-layered combination of materials including an upper layer of carpeting and a lower layer of resiliently soft material such as an expanded plastic or foam. Of course, given the separability of the individual panels from each other, any combination of panel constructions may be used. For example, a single-layered foamed pair of side panels may be used in combination with a bi-layered floor panel. In either the single-layered or multiple-layered construction, the upper (exposed) surface may be a heavy vinyl with a grain or alternative texture embossed thereupon. Regardless of construction, the upper (exposed) layer may be provided in a variety of colors so that the liner may be matched with or contrasted against the color of the vehicle.

Each of the panels is attached to another panel by hook and loop fasteners, snaps, zippers, or ties. Whichever method is selected for attachment, it is important that the attaching method be waterproof and easy to use.

The panels are removably fastenable to the bed surface preferably by a plurality of selectively positionable hook and loop fastening assemblies. preferably the loop fastening portion is provided with an adhesive to its back side. The complementary hook fastening portion includes a sturdy back. Once the proper place of affixing the hook and loop fastening assemblies is located, a machine screw fitted through the back of the hook portion is inserted through a hole defined in the pad portion. The hole is selectively defined by the person fitting the liner assembly to the bed surface of the vehicle.

Once inserted in the hole, the machine screw is locked thereto by a flat washer and a nut. The individual fitting the panels to the bed surface then locates the point on the bed surface at which the fastener fitted to the panels will overlie, and, removing the adhesive protector, fastens the complementary fastener to the bed surface. This is selectively done at strategic points on the bed surface and the panels.

By this construction, the panels may be individually or collectively attached to the bed surface, and may be selectively removed and reattached to the bed surface of the vehicle as desired by the user.

The present invention provides cushioning and protection to both passengers and cargo, thus offering a significant improvement over the prior art "bed liners" which were only (or primarily) directed at protecting the painted surface of the bed. Of course, the present invention also protects painted finishes.

While the present invention preferably has utility in pickups and vans, it should be understood, however, that it may also be applied to other uses. For example, the liner panels of the present invention may accordingly be directed at providing a pad surface for buses, campers, motor homes, horse trailers, and the like. In additon, the system may also be directed at use in recreational boats, whether they are power or sail boats.

Other advantages and features of the present invention will become apparent from the following detailed description when read in conjunction with the accompanying drawings.

BRIEF DESCRIPTION OF THE DRAWINGS

The present invention will become more fully understood by reference to the following detailed description of the preferred embodiments of the present invention when read in conjunction with the accompanying drawings, in which like reference characters refer to like parts throughout the views, and in which:

FIG. 1 is a perspective view of a rug panel attached to the bed of a pickup truck;

FIG. 2 is a perspective, exploded view of the panels of the present invention, with one side panel being shown in cutaway along the wheel well;

FIG. 3 is a close-up view showing two panel sections joined by a zipper; and

FIG. 4 is a cross-sectional view of two joined panels, with one panel being attached to a side wall of a vehicle cargo area.

DETAILED DESCRIPTION OF THE PREFERRED EMBODIMENTS OF THE PRESENT INVENTION

The drawings disclose the preferred embodiments of the present invention. While the configurations according to the illustrated embodiments are preferred, it is envisioned that alternate configurations of the present invention may be adopted without deviating from the invention as portrayed. The preferred embodiments are discussed hereafter.

Referring first to FIG. 1, a perspective view of the rug assembly, generally illustrated as 10, attached to the cargo area 12 of a vehicle 14 is illustrated. While a pickup truck is shown, it is to be understood that the rug assembly 10 of the present invention may be applied to the cargo area of virtually any vehicle such as a van or a multi-utility vehicle. Accordingly, the pickup truck 14 is used here for illustrative purposes only.

The rug assembly comprises a series of panels, including a base panel 16, a pair of side panels 18, 18', a front panel 20, and an optional rear panel 22. The base panel 16, the side panels 18, 18' and the front panel 20 are selectively removable from the cargo area 14 and are releasably interconnected with each other as will be described below.

As may be seen in FIG. 1, the side panels 18, 18' each includes a molded area 24 to accommodate the structure of the wheel well of the conventional cargo space.

The rug assembly 10 is composed of a flexible material, and, in its preferred embodiment, includes a pliable carpeting on its upper (exposed) surface, as will be more fully discussed below with respect to FIG. 4. The pliable nature of the carpeting provides the vehicle users with a relatively large comfort zone which may be used for transporting a variety of objects, including those that may be delicate and scratch-sensitive. A cargo area lined according to the present invention also finds utility as a sleep or rest area for campers or travelers, and may even be used as a playpen for children when the vehicle is stopped. To avoid damage to the upper surface of the liner assembly 10, a cargo area cap or top (not shown) should be used in conjunction with the invention.

As illustrated, each of the panels of the rug assembly 10 (with the exception of the rear panel 22) of the present invention is joined to an adjacent panel. Specifically, the bottom edge of the side panel 18 is joined to the base panel 16 along one side of the latter at a junction line 26. The forward edge of the side panel 18 is joined to a side edge of the front panel 20 at a junction line 28. The forward edge of the base panel 16 is joined to the lower edge of the front panel 20 at a junction line 30. The bottom edge of the side panel 18' is joined to the base panel 16 along one side of the latter at a junction line 26' (seen in broken lines). Finally, the forward edge of the side panel 18' is joined to a side edge of the front panel 20 at a junction line 28' (also seen in broken lines).

It should be understood that while the rug assembly 10 shown in FIG. 1 includes all of the panels 16, 18, 18', 20, 22, not all of the panels need be present. For example, the user may elect to use only the base panel 16, or he may elect to use the base panel 16 only in conjunction with the front panel 20. Each of the panels 16, 18, 18', 20, 22 is removable from the other and is individually attached to the cargo area 12 by fasteners as described below.

Referring to FIG. 2, a perspective, exploded view of the individual panels of the rug assembly 10 is illustrated, with the side panel 18 being shown in cutaway along the wheel well. This figure more clearly shows the individual components of the assembly 10 and shows their relationship to each other.

The front panel 20 optionally includes a pair of fasteners 32, 32' for improved attachment to the cargo area 12. Other accessory loop-type fasteners may be added as needed.

A variety of methods for attaching the panels 16, 18, 18', 20, 22 are possible, although the preferred method is by fasteners that may be easily released. One such method is the hook-and-loop fastener system in which the hook portion is provided on a first surface and the loop portion is provided on a second surface. Other releasably attachable systems are known. According to the present invention, one fastener half is disposed on the back side of each panel. As illustrated in FIG. 2, a plurality of fastening halves 34 are shown attached to the back side of the panel 18'. The fastening halves may be magnets for magnetic attachment to the metal walls of the cargo area 12. When the fastening halves 34 are not magnets, they are releasably attachable to other halves (not shown) fitted to the cargo area 12 of the vehicle 14. The fasteners on both the panels 16, 18, 18', 20, 22 and their respective mates provided on the surface of the cargo area 12 are strategically located so as to maximize attachment strength. While attachment of the rug assembly 10 to the cargo area 12 is generally optional, such attachment is absolutely necessary in the case of a pickup truck unless the vehicle 14 has a cover or a cap (not shown) over the cargo area 12.

FIG. 3 is a close-up view showing two joined panel sections. The illustrated panel sections may be any of the panels 16, 18, 18', 20, 22. For illustrative purposes, the side panel 18 is joined to the base panel 16. A zipper assembly 36 is shown and preferably used to attach the two panels 16, 18. The zipper assembly 36 may be composed of either a plastic or of a metal. Two adjacent panels may be alternatively fastened together by other fastening systems such as hook and loop fasteners and the like.

FIG. 4 illustrates a cross-sectional, close-up view of two joined panels, with one panel being fastened to the wall of a cargo area 12. The attached fastener includes the fastener half 34 and a fastener half 38. The fastener half 34 is fitted to the back side of a panel while the half 38 is attached to a wall 40 of the cargo area 12.

To install the panels 16, 18, 18', 20, 22, the panels are first trimmed (if necessary) to fit in their given spaces. The panels 16, 18, 18', 20, 22 are then laid over the surface of the cargo area 12. Thereafter, the fitter locates the preferred points of interconnection which would offer the most sound and strategic interattachment. For example, the fitter would naturally prefer to provide attachment assemblies at each of the corners of the rug assembly 10.

Once the fitter has identified the proper and preferred places at which to attach the assemblies, a nail, ice pick or an awl is used to punch holes in the selected panel whereby the fastener half 34 is attached to the panel by a conventional fastener (not shown) such as a nut and bolt. The fastener half 38 is fastened to the wall 40 by an adhesive, a rivet or a nut and bolt.

Two adjacent panels are shown in FIG. 4, and they could be any adjacent panels. However, for discussion, they are side panel 18' and base panel 16. FIG. 3 illustrates attachment by use of the zipper 36.

As noted, the panels of the rug assembly are each preferably composed of two layers, an upper carpet layer 42 and a lower pad layer 44. The lower layer may be an expanded plastic or may be a closed-cell polyethylene foam. It should be noted, however, that there are known polymers which may be provided as one piece and which have a lower portion which is resiliently soft as a foam and an upper portion which is a carpeted-type surface. Of course, such materials may be used in place of the present bi-layered construction.

Conventional cargo beds include a corrugated floor. This corrugation improves the strength of the floor and defines a series of parallel and spaced apart channels. FIG. 4 partially illustrates a corrugated floor 46. As may be seen, the lower pad layer 44 has defined in its external side complementary channels which provide a cooperative fit between the lower pad layer 44 and the floor 46.

As noted above, the panels 16, 18, 18', 20, 22 may be attached by a variety of methods, and the one disclosed above with respect to FIG. 3 is a zipper. However, other options are available. For example, and still with reference to FIG. 4, the side panel 18' is attached to the base panel 16 by means of a hook-and-loop fastener assembly 48. The assembly 48 includes a hook portion 50 and a loop portion 52.

Having described my invention, however, many modifications thereto will become apparent to those skilled in the art to which it pertains without deviation from the spirit of the invention as defined by the scope of the appended claims.

I claim:

1. A multi-pieced liner assembly for covering a cargo area of a vehicle pickup truck, the cargo area being defined by a truck bed having a bottom, a front wall, first and second side walls and a pivotally associated rear tail gate, said liner assembly comprising:

a plurality of panels each having a front side and a rear side and being constructed of a pliable material, said plurality of panels including a base panel, a front panel, a first side panel and a second side panel, said base panel and said front panel having a planar top surface extending between a perimeteral edge;

means for independently and releasably securing each of said panels to the cargo area of the vehicle truck bed, said securing means including a first plurality of fastener portions fitted to said rear side of each of said panels and a second plurality of fastener portions attached to an underlying surface of the cargo area, said first plurality of fasteners being located relative to said second plurality of fasteners and interengaging with said second plurality of fasteners to secure said panels within the cargo area;

at least one zipper connecting a portion of said perimeteral edge of said base member in an orthogonal relationship to a portion of said perimeteral edge of said front panel and to said first and said second panels;

whereby said panels are capable of being collectively attached to the cargo area and separately and selectively removed and reattached as desired.

2. The multi-pieced liner assembly of claim 1, further comprising a rear panel separately and releasably secured to the rear tail gate so that the tail gate may be pivoted between its open and closed positions in unimpeded fashion.

3. The multi-pieced liner assembly of claim 1 wherein said base member comprises an upper layer of a carpet like fabric and a lower layer of a foam material.

4. The multi-pieced liner assembly of claim 3 wherein said lower layer of foamed material comprises a bottom surface having a plurality of longitudinal U-shaped channels providing a complementary fit with said floor of said bottom of said truck bed.

5. The multi-pieced liner assembly of claim 1 wherein said front panel has a pair of side edge portions, one of said pair of side edge portions being releasably connected orthogonally by a zipper to an adjacent side edge portion of said first side panel and an other of said side edge portions of said front panel connected orthogonally by a zipper to an adjacent side edge of said second side panel.

6. The multi-pieced liner of claim 1, wherein said means for releasably securing said panels to the cargo area further comprises hook-and-loop fasteners extending from an upper portion of said rear side of each of said panels.

* * * * *

UNITED STATES PATENT AND TRADEMARK OFFICE
CERTIFICATE OF CORRECTION

PATENT NO. : 5,806,909
DATED : September 15, 1998
INVENTOR(S) : Ronald D. Wise

It is certified that error appears in the above-identified patent and that said Letters Patent is hereby corrected as shown below:

Column 3, line 20, delete "additon" and insert --addition--.

Column 6, line 44, (claim 3), after "carpet" delete --like--.

Column 6, claim 5 should read as follows:

--5. The multi-pieced liner assembly of claim 1 wherein said front panel has a pair of parimeteral side edges, one of said pair of side edges being releasably connected to an adjacent side edge of said first side panel and the other of said side edges of said front panel connected to an adjacent side edge of said second side panel.--

Signed and Sealed this

Twenty-eighth Day of March, 2000

Attest:

Q. TODD DICKINSON

*Attesting Officer*      *Commissioner of Patents and Trademarks*